July 21, 1931.   E. GREBY   1,815,299
AUTOMATIC TEMPERATURE REGULATOR
Original Filed Aug. 11, 1924   2 Sheets-Sheet 1
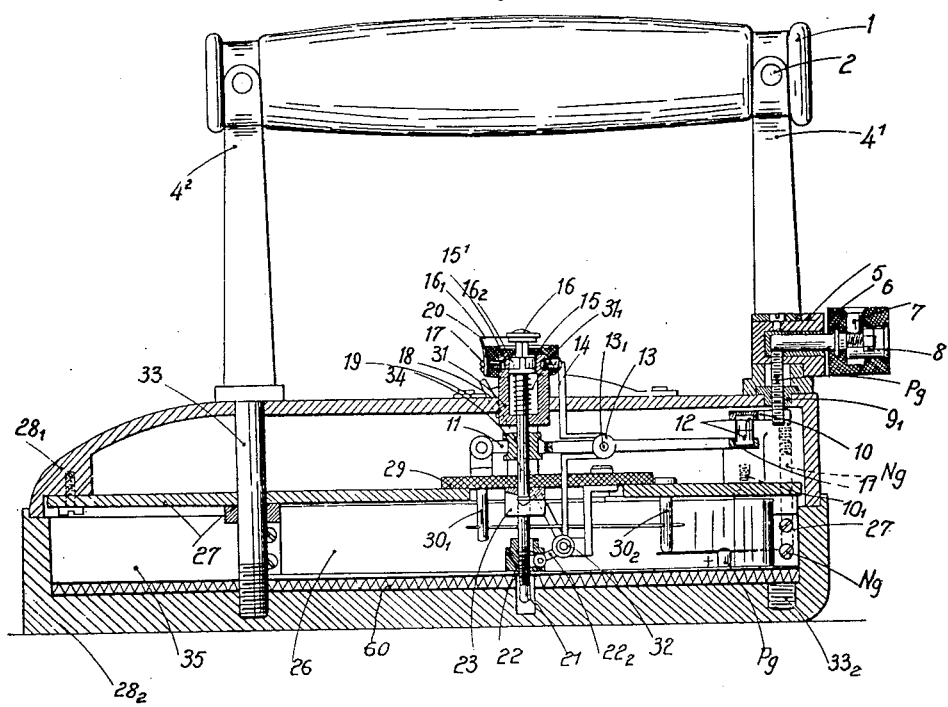
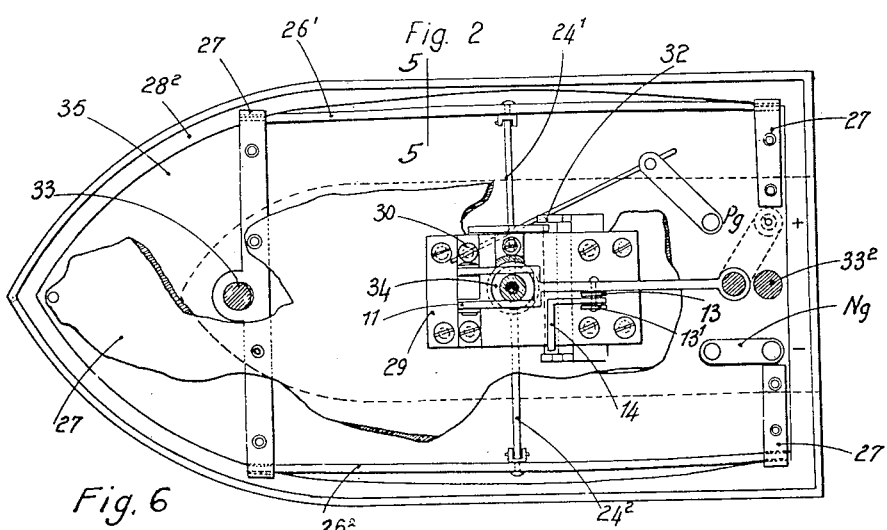
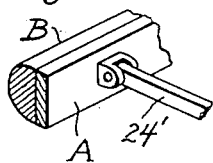
Inventor
E. Greby July 21, 1931. E. GREBY 1,815,299
AUTOMATIC TEMPERATURE REGULATOR
Original Filed Aug. 11, 1924  2 Sheets-Sheet 2

Inventor
E. Greby
By Marks & Clerk

Patented July 21, 1931

1,815,299

UNITED STATES PATENT OFFICE

ERNEST GREBY, OF ISSY-LES MOULINEAUX, FRANCE, ASSIGNOR, BY MESNE ASSIGN-
MENTS, TO GEO. M. CRESSATY, OF PARIS, FRANCE

AUTOMATIC TEMPERATURE REGULATOR

Application filed August 11, 1924, Serial No. 731,496, and in France June 6, 1924. Renewed October 16, 1928.

This invention relates to improvements in thermo-control devices, and more particularly to devices of this character capable of utilization in connection with electric heating units employed in connection with domestic flat irons, liquid heating apparatus and the like.

The invention has for its object to provide a device affording a high degree of efficiency and such features of structure as will permit a wide range of variations in the thermal conditions under which the device is controlled.

A further object is to provide means whereby the operator is at all times informed of the temperature at which the heated device is maintained, and also whether the current necessary for the operation of the heating unit is being consumed.

A still further object of the invention is to provide an automatic thermo-electric regulating device which is adapted to automatically regulate the temperature or pressure of any apparatus or enclosure, to any degree and if desired to maintain a constant temperature or pressure or operate between any predetermined limits.

The invention contemplates the use of a circuit controlling device which is actuated by a thermo or pressure responsive element through the medium of a slidable member associated with an actuating element in operative connection with the circuit controlling device whereby upon a change in temperature the responsive element moves the slidable element associated with the member of the circuit controlling device to effect a snap or abrupt action of the circuit controlling device to open or close an electric circuit, it being noted in this connection that the snap or abrupt action of the circuit controlling device prevents sparking or excessive arcing the contact points of the switch thereby eliminating the necessity of replacing the contact tips due to such arcing.

In the accompanying drawings wherein an approved embodiment of the invention is illustrated—

Fig. 1 is a longitudinal section of the device as applied to a flat iron for example.

Fig. 2 is a plan view partly broken away.

Figure 5 is a sectional view of the thermo-responsive element taken on line 5—5 of Figure 2, and Figure 6 is a perspective view partly in section of a bimetallic thermo-responsive element.

Figure 3:
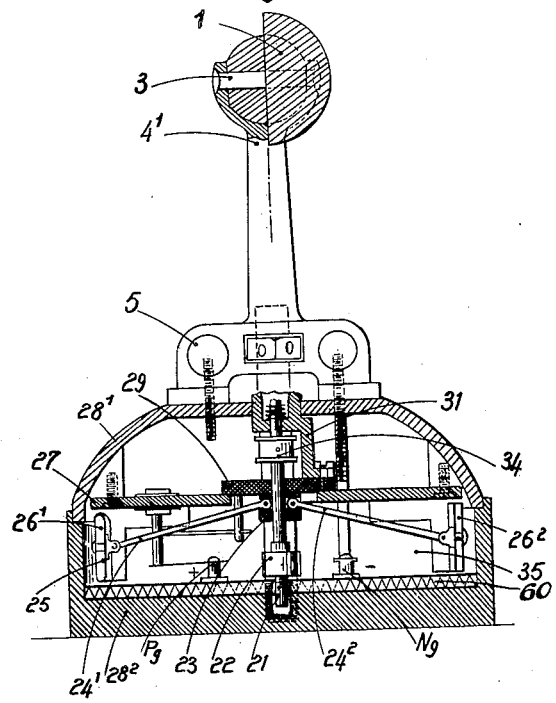
Fig. 3 is a transverse section of the flat iron, the upper portion thereof being shown in elevation.
Figure 4:
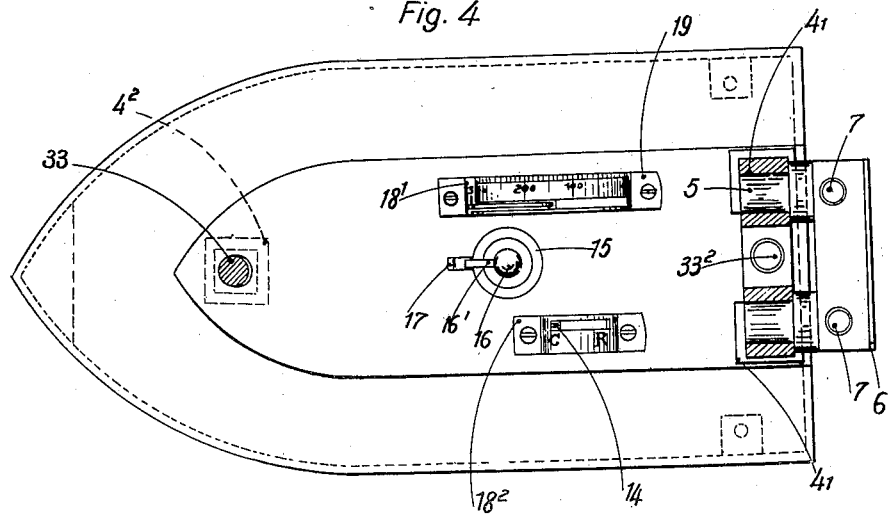
Fig. 4 is a top plan view, partly in section.

Referring to the drawings in detail in which the thermostatic control is illustrated in connection with a flat iron, although it is obvious that it may be applied to control the temperature or pressure of any apparatus desired, the numeral $28^2$ indicates the body of the flat iron carrying the top plate 28' and providing the internal heating chamber 35. The cover is provided with the usual uprights 4' and $4^2$ in which the handle 1 is riveted as indicated at 2. Within the heating chamber 35 there is arranged a supporting plate 27, and below this the resistance unit 60 is arranged. The socket of an electric connector is secured to the cover plate and indicated at 5, and is adapted to cooperate with the companion plug 6. One of the electrodes of the socket 5 is directly connected by a conductor $N_g$ with one terminal of the resistance unit 60, whereas the opposite extremity of the latter is connected with the other electrode of the socket through the thermally controlled and adjustable switch to be hereinafter more fully described.

A guide 31 is fitted in the top plate 28' and receives the upper extremity of a slidable and rotatable rod 21, the lower threaded extremity of which is slidably mounted in the body $28^2$. An insulating plate 29 is attached to the plate 27, and pivotally supports the switch arm 11 carrying one of a pair of contacts 12, the other of which is connected through connectors 10 and 9' with the second mentioned electrode of the socket 5. The current passing through the contacts 12, lever 11, posts 30' and $30^2$ is conducted thus to the second mentioned terminal of the resistance unit 60. The vertical motion of the rod 21 controls the contact 12 and it is effected as follows: depending brackets are attached to the plate 27 and between the brackets of each pair there is located outwardly bowed thermo-sensitive elements 26′ and 26², which when heated flex outwardly actuating the arms 24′ and 24² pivotally secured thereto, and moving the slide 23 downwardly along the rod 21. The thermo-sensitive elements 26′ and 26² may be of aluminium, brass, or the like, according to the degree of sensitivity desired or of the tractive power which may be required according to the work for which the apparatus is intended. The part could, for this purpose, be of hollow form and filled with a heavy liquid or a liquid having a high or low boiling point or with a readily expansible alloy or, if so desired, the hollow part could be filled with air at atmospheric pressure: their ends may be rendered fluid tight by compression during manufacture. Besides these compressions, they are slightly curved during manufacture, in order to direct the effects of the expansion to the center of the plates 26 and according to a definite perpendicular direction. The lower extremity of the rod 21 is threaded and an abutment 22 is adjustably fitted thereon. Upon outward flexure of the elements 26′, 26², the slide 23 is brought into engagement with the abutment 22, and the consequent movement of the rod 21 is imparted to the switch lever 11 through the collar 34 fixed to the rod 21 and coacting with the lever 11, thus breaking the circuit of the heating unit 60 at the contacts 12.

While the thermo-responsive elements 26¹ and 26² are illustrated as being hollow and adapted if so desired to be filled with a liquid, it is believed obvious that they may be of solid form or of rectangular or any shape. The thermo-responsive element as illustrated in Figure 2 and as just described is in the form of a hollow responsive element. However, as illustrated in Figure 6, a bimetallic thermo-responsive element may be used instead of the hollow element 26¹ and 26². The bimetallic element is composed of two strips A and B of different material and connected to the device in a manner similar to the hollow member as illustrated in Figure 2 by means of the actuating arm 24¹. The bimetallic element may be composed of two separate metals having different coefficients of expansion or it may be a single plate constructed in the usual manner.

In order to vary the temperature at which the circuit of the resistance unit is interrupted the rod 21 may be rotated, and in so doing the abutment 22 is displaced axially thereon. The abutment is held against rotation by an arm 22² fixed to a shaft 32 journaled in a bracket attached to the plate 29 and swivelled to the abutment 22. In order that the position of the abutment 22 on the rod 21 may be known an indicating arm 18 is attached to the shaft 32 and projects through a slotted plate 19 on the cover 28′.

A calibrated scale 18′ is attached to the plate 19, and the calibration thereof read in connection with the position of the lever 18 indicates the position of the abutment 22 as well as temperature at which the iron will be automatically maintained.

A second indicating arm 14 is pivotally mounted on the shaft 32 and is formed medially with a U-shaped portion 13′ in which is received a grooved roller 13 rotatably mounted on the lever 11. A slide plate 18² receives the arm 14 and the latter indicates the position of the switch arm 11, that is to say, whether it is in on or off position. During oscillation of the lever 11 its movement, it will be understood, is transmitted to the indicating arm 14 by the roller 13 moving in the U-shaped portion 13′.

A knob 15 is rotatably secured on the end of the guide 31 by screws 17 engaging in an annular groove and receives the upper rectangular extremity of the rod 21, whereby the latter may be manually turned to effect adjustment of the abutment 22. The rod 21 is normally urged upwardly by a spring 31′, but may be depressed manually to open the switch arm 11 by pressure exerted on the knob 16, which latter carries an arm 16′ engageable under a spring 20 when said arm is turned relatively to the rod 21, whereby to retain the rod in depressed position and the switch lever 11 in open position.

In use, adjustment of the knob 15 adjusts the abutment 22 along the rod 21, and the movement thereof is transmitted to the arm 18, and by reference to the scale 18′ the operator is able to so adjust the mechanism that the circuit of the heating unit is automatically opened at a predetermined temperature. Under these conditions, current flows from the connector $N_g$ through the resistance unit 60, and the following parts $P^9$, $30^2$, $30'$, switch 11, contacts 12 to the other electrode of the socket. When the temperature of the iron exceeds the limit for which it has been adjusted, the outward flexure of the elements 26′, 26² displaces the slide 23 along the rod 21 until the abutment 22 is engaged and moved and the corresponding motion of the rod 21 transmitted to the lever 11 opens the circuit at the contacts 12. When the temperature of the iron is reduced, the thermo-sensitive elements resume their former positions and the spring 31′ restores the rod 21 and switch lever to switch-closing position. In order to render the iron inoperative for a prolonged period, the rod 21 is depressed manually, and held in this position by turning the arms 16′ under the spring 20.

While there is shown and illustrated the device used in connection with a flat iron, it is to be distinctly understood that it is not only capable of various modifications, but many applications and may be used for regulating or controlling the temperature or pressure of any device desired. It may be constructed and designed to any capacity and is capable of many uses without departing from the spirit and the scope of the invention and it is intended, therefore, that only such limitations shall be imposed thereon as are indicated in the prior art or in the appended claims.

Claims:

1. In a thermostatic circuit controller, a circuit controlling device including a movable member, an actuated member associated with the movable member, a thermo-sensitive element, a slide actuated by the thermo-sensitive element, an adjustable abutment on the actuating member engageable by the slide whereby to effect movement of the actuating member and the movable member for opening the circuit controlling device.

2. In a thermostatic circuit controller, a circuit controlling device including a movable member, an actuated member associated with the movable member, a thermo-sensitive element, a slide actuated by the thermo-sensitive element, an adjustable abutment on the actuating member engageable by the slide whereby to effect movement of the actuating member and the movable member for opening the circuit controlling device, means for adjusting said abutment to vary the moment of actuation of the circuit controlling device.

3. In a thermostatic circuit controller, a circuit controlling device including a movable member, an actuated member associated with the movable member, a thermo-sensitive element, a slide actuated by the thermo-sensitive element, an adjustable abutment on the actuating member engageable by the slide whereby to effect movement of the actuating member and the movable member for opening the circuit controlling device, means normally tending to maintain the circuit controlling device in circuit closing position, and means for rendering the last mentioned means inoperative to permit the circuit controlling device to remain in open position for an unlimited period subsequent to its actuation by the thermo-sensitive means.

4. In a thermostatic circuit controller, a circuit controlling device including a movable member, an actuated member associated with the movable member, a thermo-sensitive element, a slide actuated by the thermo-sensitive element, an adjustable abutment on the actuating member engageable by the slide whereby to effect movement of the actuating member and the movable member for opening the circuit controlling device, means normally tending to maintain the circuit controlling device in circuit closing position, and means for rendering the last mentioned means inoperative to permit the circuit controlling device to remain in open position for an unlimited period subsequent to its actuation by the thermo-sensitive means and means for indicating the position of the adjustable abutment.

5. In a thermostatic circuit controller, a circuit controlling device including a movable member, an actuated member associated with the movable member, a thermo-sensitive element, a slide actuated by the thermo-sensitive element, an adjustable abutment on the actuating member engageable by the slide whereby to effect movement of the actuating member and the movable member for opening the circuit controlling device, means normally tending to maintain the circuit controlling device in circuit closing position, and means for rendering the last mentioned means inoperative to permit the circuit controlling device to remain in open position for an unlimited period subsequent to its actuation by the thermo-sensitive means and means for indicating the position of the adjustable element, and means for indicating the position of the circuit controlling device.

6. In a thermostatic circuit controller, a circuit controlling device including a movable member, an actuated member associated with the movable member, a thermo-sensitive element, a slide actuated by the thermo-sensitive element, an adjustable abutment on the actuating member engageable by the slide whereby to effect movement of the actuating member and the movable member for opening the circuit controlling device, means normally tending to maintain the circuit controlling device in circuit closing position, and means for rendering the last mentioned means inoperative to permit the circuit-controlling device to remain in open position for an unlimited period subsequent to its actuation by the thermo-sensitive means, means for adjusting the abutment relative to the actuated member for varying the moment of actuation of the circuit controlling device with respect to the thermo-condition of the thermo-sensitive element.

7. In a thermostatic circuit controller, a circuit controlling device including a movable member, an actuated member associated with the movable member, a thermo-sensitive element, a slide actuated by the thermo-sensitive element, an adjustable abutment on the actuating member engageable by the slide whereby to effect movement of the actuating member and the movable member for opening the circuit controlling device, means normally tending to maintain the circuit controlling device in circuit closing position, and means for rendering the last mentioned means inoperative to permit the circuit controlling device to remain in open position for an unlimited period subsequent to its actuation by the thermo-sensitive means, and means for indicating the adjustment of the abutment.

8. In a thermostatic circuit controller, a circuit controlling device including a movable member, an actuated member associated with the movable member, a thermo-sensitive element, a slide actuated by the thermo-sensitive element, an adjustable abutment on the actuating member engageable by the slide whereby to effect movement of the actuating member and the movable member for opening the circuit controlling device, means normally tending to maintain the circuit controlling device in circuit closing position, and means for rendering the last mentioned means inoperative to permit the circuit controlling device to remain in open position for an unlimited period subsequently to its actuation by the thermo-sensitive means, and means for indicating the adjustment of the abutment, means for varying the position of the adjustable abutment, spring return means for the circuit controlling device and means for rendering the spring controlled means inoperative, the adjusting means for the abutment and the means for rendering the spring means inoperative occupying telescopically relative positions.

9. The thermostatic control as claimed in claim 1 characterized in that the actuating member and abutment are threaded together to facilitate adjustment of the latter member.

10. In a thermostatic circuit controller, a circuit controlling device including a movable member, an actuated member associated with the movable member, a thermo-sensitive element, a slide actuated by the thermo-sensitive element, an adjustable abutment on the actuating member engageable by the slide whereby to effect movement of the actuating member and the movable member for opening the circuit controlling device, said abutment being threaded on the actuating member, means for permitting rotary movement of the actuating member to effect adjustment of the abutment, spring means normally tending to move the circuit controlling device to closed position, means for rendering the spring means inoperative to permit the circuit controlling device to remain open for an unlimited period.

11. In a thermostatic circuit controller, a circuit controlling device including a movable member, an actuated member associated with the movable member, a thermo-sensitive element, a slide actuated by the thermo-sensitive element, an adjustable abutment on the actuating member engageable by the slide whereby to effect movement of the actuating member and the movable member for opening the circuit controlling device, said abutment being threaded on the actuating member, means for permitting rotary movement of the actuating member to effect adjustment of the abutment, spring means normally tending to move the circuit controlling device to closed position, means for rendering the spring means inoperative to permit the circuit controlling device to remain open for an unlimited period, the last mentioned means and the means for turning the actuating member being telescopically related.

12. In a thermostatic circuit controller, a thermo-sensitive element, actuating members, means actuated by the thermo-sensitive element and operating the actuating members, means for varying the position of certain of the actuating members relative to the thermo-sensitive element, contact members for controlling an electric circuit, and operating means interposed between the actuating members and the contact members.

13. In a thermostatic circuit controller, a thermo-sensitive element, a slide, means actuated by the thermo-sensitive element for operating the slide, an abutment engageable by the slide whereby to effect the actuating movement, means for varying the position of the abutment relatively to the slide and the thermo-sensitive element, contact members for controlling the electric circuit, and operating means interposed between the abutment and the contact members.

14. In a thermostatic circuit controller, a thermo-sensitive element, a threaded actuating rod, a slide movable along said rod, means actuated by the thermo-sensitive element to operate the slide, an abutment threaded on the rod and adapted upon rotation of the latter to be displaced relatively to the slide and the thermo-sensitive element, circuit controlling contact members, and operating means interposed between the abutment and the contact members.

15. In a thermostatic circuit controller, two thermo-sensitive elements, actuating members arranged on the axis of symmetry of said thermo-sensitive elements, means symmetrically actuated by the thermo-sensitive elements and actuating the actuating members, circuit controlling contact members, and operating means interposed between the actuating members and the contact members.

16. In a thermostatic circuit controller, a thermo-sensitive element, a slide actuated by the thermo-sensitive element, an abutment engageable by the slide, a circuit controlling contact member, resilient members tending to move the abutment in the direction opposite to the thrust action of the slide whereby when the temperature decreases the contact members under the action of the resilient members are closed.

17. In a thermostatic circuit controller, a thermo-sensitive element, actuating members actuated by the thermo-sensitive element, circuit controlling contact members, operating means interposed between the actuating members and the contact members, means normally tending to effect closing of the contact members, and controlling means associated with the last mentioned means and adapted in one position to permit actuation of the contact members under the influence of the thermo-sensitive element and in a second position to retain the contact members in open position.

18. In a thermostatic circuit controller, a thermo-sensitive element, actuating members actuated by the thermo-sensitive element, circuit controlling contact members, operating means interposed between the actuating members and the contact members, means normally tending to move the actuating members to a position for effecting closing of the contact members, and controlling means associated with the last mentioned means and adapted in one position to permit actuation of the contact members under the influence of the thermo-sensitive element and movable to another position to maintain the contact members in circuit opening position.

19. In a thermostatic circuit controller, a thermo-sensitive element, a slide actuated by the thermo-sensitive element, an abutment engageable and movable by the slide, circuit controlling contact members, operating means interposed between the abutment and contact members including a rod, means normally tending to maintain the contact members in circuit closing position, an adjusting knob for the rod, supporting means receiving the rod, and means interposed between the knob and supporting means to actuate the rod and render the contact member maintaining means in operative or inoperative position to permit of the automatic or manual control of the contact members.

20. In a thermostatic circuit controller, a thermo-sensitive element, circuit controlling contact members, actuating members interposed between the thermo-sensitive element and the contact members, and means for manually actuating the contact members to move the circuit controlling members to circuit opening or closing position, said means operating to retain the controlling members in circuit opening position.

21. In a thermostatic circuit controller, a thermo-sensitive element, actuating members connected with the thermo-sensitive element, means for varying the position of certain of the actuating members with respect to the thermo-sensitive element, means for indicating the position of adjustment of said actuating member, and contact members controlled by the actuating members.

In testimony whereof I have signed my name to this specification.

ERNEST GREBY.